G. A. TOAZ, W. E. WILBER AND H. E. MAYNARD.
STEERING GEAR.
APPLICATION FILED OCT. 26, 1918.

1,310,222.

Patented July 15, 1919.

Witness

Inventors
GLENN A. TOAZ.
WALLACE E. WILBER.
HOWARD E. MAYNARD.
By Ralzemond A. Parker
Their Attorney

UNITED STATES PATENT OFFICE.

GLENN A. TOAZ, WALLACE E. WILBER, AND HOWARD E. MAYNARD, OF DETROIT, MICHIGAN.

STEERING-GEAR.

1,310,222.  Specification of Letters Patent.  Patented July 15, 1919.

Application filed October 26, 1918. Serial No. 259,738.

*To all whom it may concern:*

Be it known that we, GLENN A. TOAZ, WALLACE E. WILBER, and HOWARD E. MAYNARD, citizens of the United States, residing at Detroit, county of Wayne, State of Michigan, have invented a certain new and useful Improvement in Steering-Gears, and declare the following to be a full, clear, and exact description of the same, such as will enable others skilled in the art to which it pertains to make and use the same, reference being had to the accompanying drawings, which form a part of this specification.

Our invention relates to gearing and an object of our improvements is to provide for securing two engaging gear wheels with their axes at a proper distance apart. We have shown our invention embodied in a steering mechanism for automobiles.

$a$ is a worm and $b$ is a worm wheel. It is necessary that the worm and wheel have their axis at a certain distance apart so that they shall accurately engage at their pitch lines.

Figure 1:
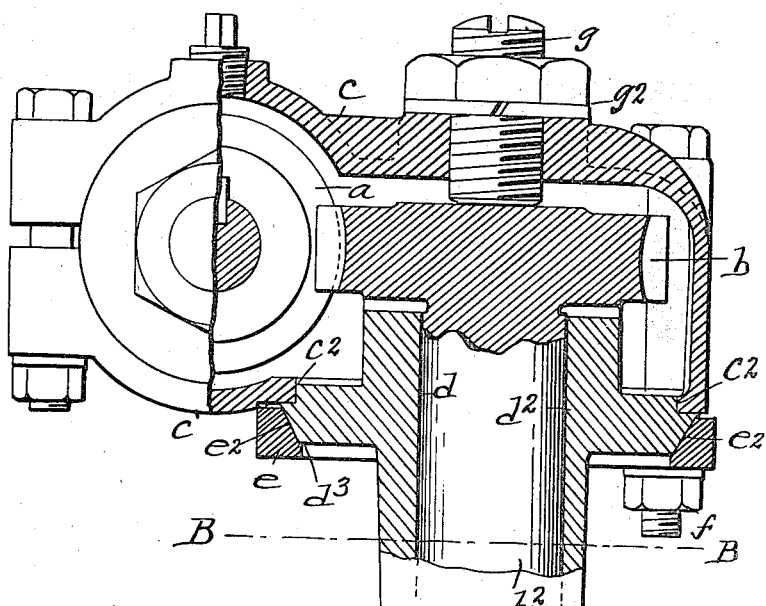
Figure 1 is a portion of an automobile steering gear with some of the parts in section and the gear casing in part broken away.
Figure 2:
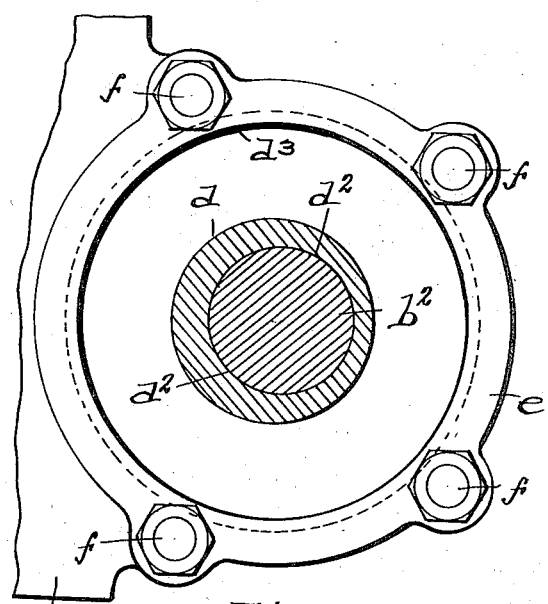
Fig. 2 is a section on the line B—B Fig. 1.

$c$ is a casing for the gearing. This has a circular aperture $c^2$ through its wall for receiving the bearing piece for the arbor $b^2$ of the gear wheel $b$. $d$ is the bearing piece for the arbor $b^2$ of the wheel $b$. This has a cylindrical portion engaging in the circular aperture $c^2$ in the casing $a$. The bearing piece $d$ extends outward from the aperture $c^2$ and has the beveled portion $d^3$ around its outer edge adjacent to the wall of the casing $c$. The bearing piece $d$ has a cylindrical aperture $d^2$ formed through it longitudinally parallel with its axis and somewhat eccentric to said bearing piece as shown most distinctly in Fig. 2. The arbor $b^2$ of the gear wheel $b$ bears in said aperture.

$e$ is an annulus having a beveled or conical inner wall $e^2$ adapted to fit against the corresponding surface $d^3$ of the bearing piece $d$. $f\ f\ f\ f$ are bolts and nuts engaging the casing $c$ and the annulus $e$ so as to press the annulus toward the casing, bind it thereto, and force the surface $e^2$ against the surface $d^3$.

The bearing piece $d$ is turned until the wheel $b$ has its axis accurately at the proper distance from the axis of the worm $a$. The annulus $e$ is then placed in position with the surface $e^2$ engaging the surface $d^3$ and the annulus is bound in this position forcing the surface $e^2$ firmly against the surface $d^2$ by means of the nuts and bolts $f\ f\ f\ f$, thus causing a frictional engagement which firmly fixes the bearing piece $d$ in position and the wheel $b$ in the position to which it has been adjusted.

$g$ is a set screw having a nut $g^2$ thereon, its outer end engaging the face of the wheel $b$ near its center so as to restrain the latter from movement in a direction of its axis.

What we claim is:

1. In a train of gearing, the combination of a gear wheel, a bearing-piece, said gear wheel having an arbor engaging eccentrically in said bearing-piece, said bearing-piece engaging in an aperture coaxial therewith, and means acting in a direction substantially parallel to the axis of said bearing-piece for frictionally engaging the latter to hold it from rotation.

2. In a train of gearing, the combination of a gear wheel, a bearing-piece, said gear wheel having an arbor engaging eccentrically in said bearing-piece, said bearing-piece engaging in an aperture coaxial therewith, a non-rotatable ring surrounding said bearing-piece and adapted to engage the same, and means for frictionally engaging said ring against said bearing-piece.

3. In a train of gearing, the combination of a gear wheel, a bearing-piece, said gear wheel having an arbor engaging eccentrically in said bearing-piece, said bearing-piece engaging in an aperture coaxial therewith, a non-rotatable ring surrounding said bearing-piece and adapted to engage the same, and means for frictionally engaging said ring against said bearing-piece, said ring and said bearing-piece engaging at surfaces the cross section of which form an angle with the axis of said bearing-piece.

In testimony whereof, we sign this specification.

GLENN A. TOAZ.
WALLACE E. WILBER.
HOWARD E. MAYNARD.